United States Patent Office

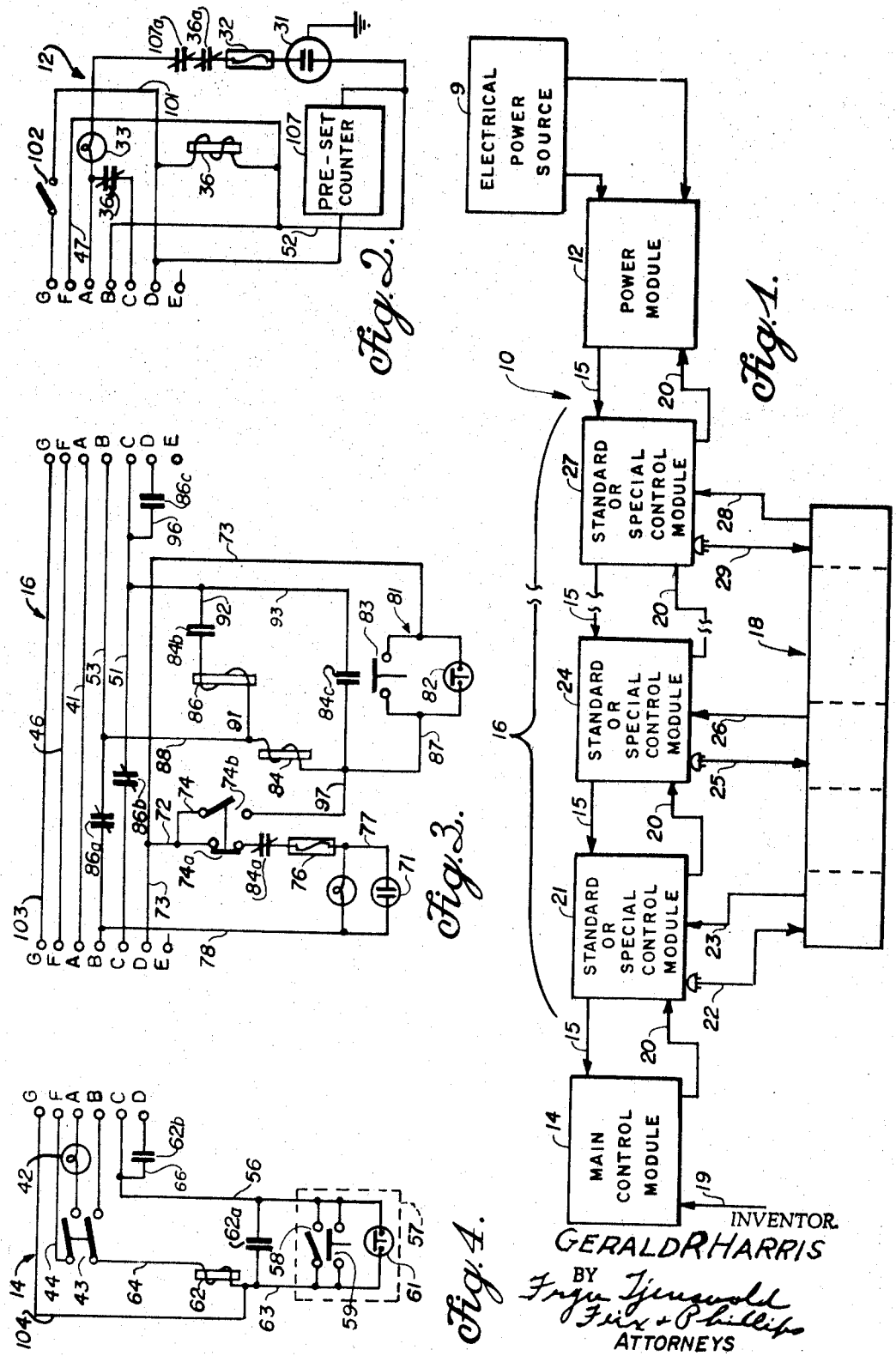

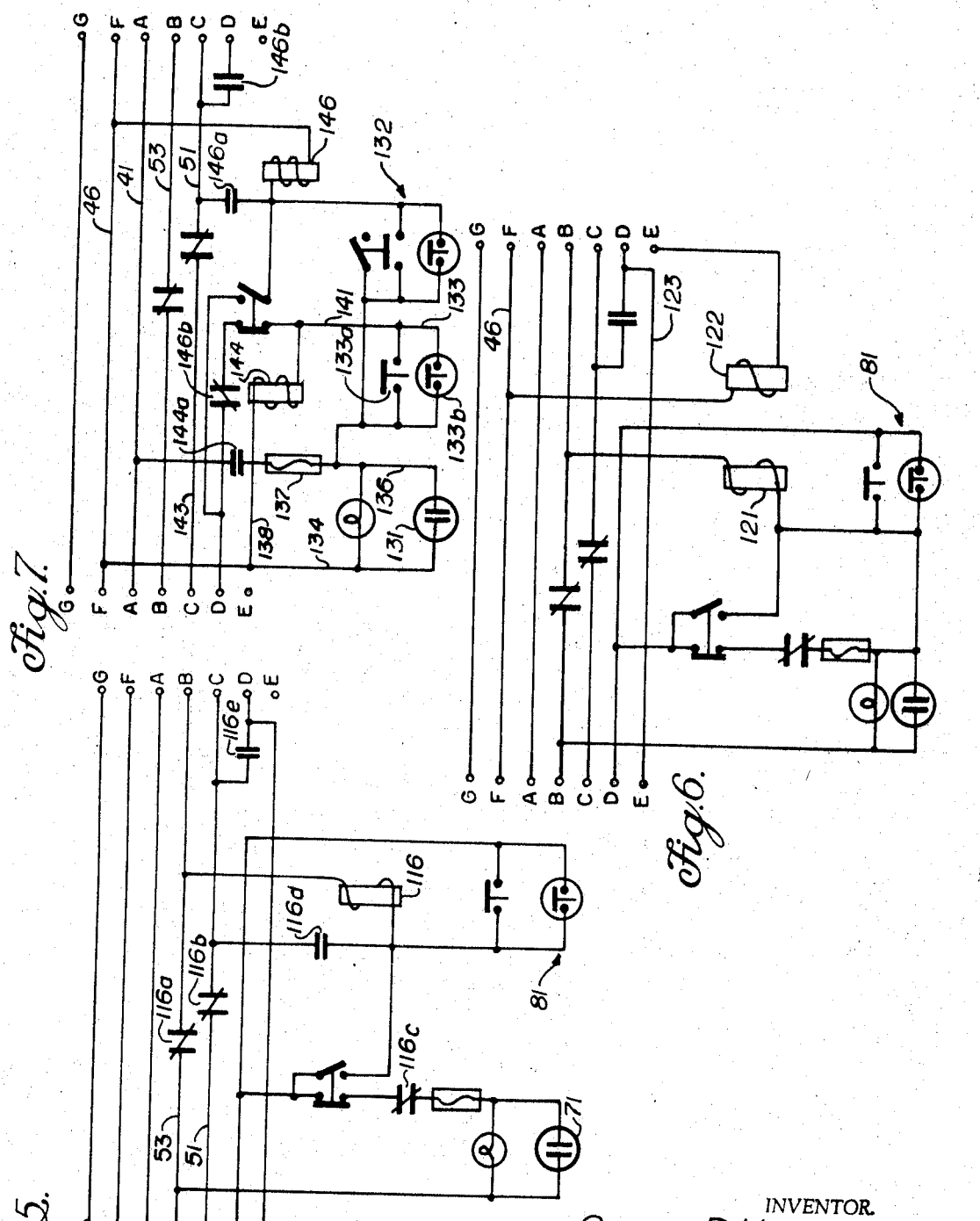

3,433,972
Patented Mar. 18, 1969

3,433,972
MACHINE TOOL CONTROL SYSTEM
Gerald R. Harris, 1230 Camelia Drive,
Livermore, Calif. 94550
Filed Nov. 4, 1966, Ser. No. 592,059
U.S. Cl. 307—38                                    19 Claims
Int. Cl. H02j 3/14

ABSTRACT OF THE DISCLOSURE

A modular electrical control system utilizing a single power supply and any number of various, readily interchangeable control modules capable of performing a variety of functions for controlling machine tools, whereby the tools can be made to automatically perform various preselected operative steps in a predetermined sequence.

---

The present invention relates to an electrical control system and more particularly to an improved electrical control system formed of a plurality of readily interchangeable plug-in modules for automatically or semi-automatically controlling the sequence of operation of electro-mechanical and/or electro-hydraulic machine tools.

There are various systems available for automatically or semi-automatically controlling power tools (e.g., drills, lathes, shapers, presses, etc.) utilizing a composite control circuit disposed within a single housing, wherein the system circuit is specifically designed to perform a pre-set sequence of operations and is not capable of being readily adapted to any other sequence. Such control systems are generally adapted for use with one particular tool and one set of operations performed therby, wherein changes in the sequence of operations is not contemplated. Thus, in these systems there is an obvious lack of versatility. Furthermore, since such systems generally utilize an integrally combined power supply and control circuit, such lack of versatility makes it necessary for each control system to be provided with its own power supply.

Other more versatile control systems are known but generally employ complex computer systems which are very expensive, thus making them impractical for the average workshop.

The present invention overcomes the above-noted shortcomings of the prior art control systems by providing a modular electrical control system utilizing a single power supply and any number of various, readily interchangeable control modules. The system is capable of performing a variety of functions for controlling machine tools, whereby the tools can be made to automatically perform various pre-selected operative steps in a predetermined sequence. The number, sequence and type of control modules utilized are specifically selected to produce the desired operation whereby custom design is made possible without the cost normally attendant thereto.

Since the invention utilizes a modular construction, a single defective module may be readily replaced without disturbing the rest of the control system, thereby reducing the down-time of the machine tool. Furthermore, a module may be inserted, added or removed without changing the basic operative concept of the invention control system. That is, the control system may be adapted for delivering high power at one stage of the sequence of operative steps for starting large motors, for example, even though high power is not introduced directly into the system itself; or adapted to step from one operative step to another in response to a time, pressure, overload, or temperature signal, rather than by a travel limit signal or adapted to provide one operative step in the sequence which is initiated by a module of the invention, but is turned off any number of steps later by another module or by a manual command initiated by the machine tool operator.

The invention control system in its most common embodiment provides a serially stepping sequence of operative steps wherein the power to a module is removed as the succeeding module is turned on.

Accordingly, it is an object of the present invention to provide a modular electrical control system for control of machine tools, which system is readily adaptable to provide a diversity of functions and sequences of operations for a machine tool by merely plugging the required control modules together.

It is another object of the invention to provide a modular electrical control system for controlling machine tools, wherein a plurality of control modules may be plugged together to provide a selected sequence of operations, and wherein power is supplied to only one module at a time, the other modules being turned off.

It is still another object of the invention to provide a control system wherein premature triggering of one step in a sequence of steps is prevented, since power is supplied to the module only when that module is to operate, and the position of the start switches is immaterial until the time for that particular step.

It is yet another object of the invention to provide an electrical control system wherein a single start switch or remotely controlled start switch is capable of triggering two modules at two different steps of the sequence, since power is supplied to the modules only when the step is to be performed and not before or after.

It is still a further object of the invention to provide a modular control system wherein it is not necessary to supply external power for starting the operative steps of the sequence.

Other objects and advantages will be apparent from the following description taken in conjunction with the drawings, in which:

FIG. 1 is a block diagram showing a basic electrical control system configuration of the invention;

FIGS. 2, 3 and 4 are schematic diagrams of a power supply module, a main control module, and a "standard" control module, respectively, of the invention;

FIGS. 5, 6 and 7 are electrical schematic diagrams of alternative embodiments of the "standard" control module of FIG. 4; and Referring to FIG. 1, the control system 10 of the present invention comprises a power supply module 12 which receives electrical power from a conventional source 9, a main control module 14 which initiates operation of the system, and one or more standard and/or special control modules 16 which control the tool or tools 18 being operated by the system.

The several control modules 16, power module 12 and main control module 14 are all electrically joined through multi-contact plug connector units which also serve to mechanically join the modules. When the units are plugged together a B+ path 15 is established through all of the modules making the electrical energy source potentially available through any of the modules. The particular module which actually delivers electrical energy does so through a path 20 from the previous module. Thus for the simplest system, one including a power module 12, one control module 16 and a main control module 14, power is directed over path 15, main control module 14, path 20 and the control module 16. If a second control module 16 is inserted between the power module and the first module 16, it delivers power (when porperly conditioned) from a path which includes path 15, the first module 16 and path 20 from the first module 16. When the main control module 14 receives a start signal 19, which may be manually or automatically generated, the control module 21 electrically adjacent to main control module 14 is energized and directs the source of electrical power to the tool 18 via path 22 whereby a tool operation commences.

Upon the occurence of a predetermined event (termination of the operation controlled by module 21, or the attainment of a particular temperature, or the advancement of a part to a particular position, etc.) a signal is sent over path 23 to module 21 which results in the output path 22 being de-energized and the output path 25 of the next module 24 being energized. In effect the power from power module 12 is stepped from the main control module to the several intermediate control modules, sequentially, in response to signals received from transducers which detect various relevant events. It is possible, however, by employing a special control module to have a module remain energized when the subsequent module becomes energized. The standard modules automatically become de-energized when a subsequent module is energized and are characterized by that feature. Thus, when all of the modules between the power module and main control module are standard modules, the operation will be a stepping sequence with the various operations controlled by the control modules occurring one after the other.

When the tool 18 completes the operation controlled by module 24 a signal is sent to module 24 via path 26 which energizes the next module 27, resulting in power on output path 29 and de-energization of path 25. The path 29 leads to the tool 18 thus starting a new operation of the tool. Completion of the operation controlled by module 27 results in a signal to module 27 via path 28 which can operate to shut down the system until a new signal is received by main control module 14. The control module can be conditioned to automatically start a new cycle after the last module completes its operation. Which of the variations is selected depends on the tool 18 and the overall operation to be performed thereby.

One of the outstanding features of the invention which will be described in greater detail below, is the protection afforded against premature performance of an operation. When a particular module is energized only a signal to that module can result in a new module being energized and thus a new operation commenced—all other modules are inoperative with respect to the tool and non-responsive to start signals. Thus if the module 21, for instance, is energized (its output path 22 delivering power) and module 27 should receive a spurious start signal, the operation controlled by module 27 would not be initiated as the module would not respond. Likewise, a signal to module 21 while module 27 is energized has no effect. Thus it is possible for the same event and transducer to trigger two or more modules, such as module 21 and module 27.

If the particular tool being controlled requires that the operation controlled by module 24 start after the operation controlled by module 21 but that the two operations continue thereafter (if both were to start and continue together they could both be controlled by one module) then a special module would be employed wherein the module is characterized by its ability to remain energized after energization of the subsequent module and its need for a separate stop signal to de-energize it or an internal clock to shut it off. If the start of the operation controlled by module 27 were to coincide with the stop of the operation controlled by special module 21, then the same signal which starts module 27 could be used to stop (de-energize) module 21.

One other special module which will be described in detail below is one with a time delay which can either automatically turn itself off after a given time period or extend its energization past the energization of a subsequent module for a preselected time period whereby a stop signal is not required.

The possible combination and interconnection of standard and special modules is virtually endless making it possible to meet the needs of almost any system. Once the needs of a system are determined, the correct combination of modules are simply plugged together to form the required control system.

The fact that the only energized module is the operating module (except in the special situation discussed above) gives the system a very desirable safety feature; electrical mishaps are avoided by restricting all electrical energy to the operating module alone. The system also prevents continued operation after a malfunction, which can aften lead to very serious destructive results. If an operation breaks down, the control system will not step to the next operation thus the system automatically shuts down until repairs are made.

The signals which step the electrical energy from one module to another will for the most part be generated by one or more switches. Each module has a plug for receiving the leads of a remote switch and also has a local manually operable switch which can be used to step the system. The output paths are realized by electrical plugs which become energized with system voltage when, and only when, their respective modules are the controlling or operative module. The particular transducers or electrically responsive devices which induce the remote signal switches to operate and which control the tool in response to energization of a plug may be any of several devices well known in the art and do not form a part of this invention except as they operate to associate the present invention with a tool.

Referring now to FIGS. 2, 3 and 4, the power module 12 includes a grounded plug 31 disposed to receive electrical energy from source 9 (see FIG. 1). While the invention will be described with reference to a system employing a source of electrical energy which is 110 volts AC, single phase, it will be clear after the invention has been described that the use of other forms of electrical energy, such as DC or polyphase 220, are well within the teachings of the invention making it unnecessary to describe in detail electrical circuits employing these various forms of electrical energy. One side of plug 31 (defined as positive for descriptive purposes) is electrically joined to a connector plug contact A through the series circuit of a fuse 32, normally closed switch contacts 36a, and an indicator light 33. The switch contacts 36a are operated by a relay coil 36 electrically disposed between plug contact D and the negative side of plug 31. In the description which follows a relay coil will be given a number and the switch contacts operated thereby will be given the same number followed by a letter, as done above with regard to coil 36 and switch contacts 36a.

The module 16 (standard) includes an output connector contact A which joins to the connector contact A of the power module, and an input connector contact A which joins to the output connector contact A of either a subsequent module or the main control module 14. The input and output connector contacts A of control module 16 are joined by an electrically continuous conductor 41. All of the standard and special modules (as will be shown in detail below) include a continuous conductor between the input and output connector contacts A thereof so that regardless of the combination of standard and special modules plugged together between a power module 12 and a main control module 14, there will always be electrical continuity between the connector contact A of the power module and the connector contact A of the main control module 14. The connector contact A of the main power module 14 leads through an indicator light 42 to a double-pole, double-throw switch 43 which is electrically joined by a conductor 44 to a connector contact F. The connector contacts F of the control modules 16 are all joined by a continuous conductor, such as conductor 46, thus assuring continuity through all of the control modules regardless of their particular functions or variations from a standard control module. The connector contact F of the power module 12 is electrically joined through a conductor 47 to the negative side of plug 31, such that when the double-pole, double-throw switch 43 is closed, a complete circuit is formed from the positive side of plug 31 through the indicator light 33, contacts A, conductor 41, indicator light 42, conductors 44 and 46 and contacts F to the negative side of plug 31. Since there are no switches or other means for introducing a discontinuity into this path other than the switch 43, this particular circuit will always carry current and thus light the indicator lights 33 and 42 to show that the switch 43 has been closed and the system is energized and operable.

The main source of electrical energy for operating machines is provided at connector contact C of power module 12 which is electrically joined to connector contact A through a normally closed switch 36b. The input and output connector contacts C of the control module are joined by a source conductor 51 which includes a normally closed switch 86b which is capable of being opened and forming a discontinuity interrupting the source of electrical energy from power module connector contact C. The power module contact B is electrically joined through a conductor 52 directly to the negative side of plug 31 and provides the return path for electrical energy provided by contact C. A conductor 53 between the input and output connector contacts B of control module 16 includes a normally closed switch 86a which is capable of forming a discontinuity in conductor 53, and thus interrupting the return path to the negative side of plug 31. All of the standard and special control modules 16 include switches between their input and output connector contacts C and their input and output connector contacts B, such that when a system is formed and all of the switches are in their normally closed condition the contact C of the main control module 14 sees the positive voltage of the plug 31, while the contact B provides a current return path.

The main control module connector contact C is electrically joined through a conductor 56 to switch means 57. Switch means 57 includes a single-pole, single-throw switch 58, a push button manually operable switch 59 and a remote switch plug 61 all electrically joined in parallel. The single-pole, single-throw switch 58 provides a means for permanently closing switch means 57, the push button switch 59 provides means for manual operation of the switch means 57, while the remove plug connector 61 makes it possible to operate switch means 57 from some relatively distant location in response to a particular event. The other side of switch means 57 is electrically joined to a relay coil 62 by an electrical conductor 63 with the other side of relay coil 62 being electrically joined to the double-pole, double-throw switch 43 by conductor 64. With the switch 43 closed, operation of switch means 57 completes an electrical circuit through coil 62 causing the coil to be energized and operating the normally open switch contacts 62a which are disposed electrically in parallel with the switch means 57. Once switch contacts 62a are closed, they latch the electrical circuit such that the subsequent opening of switch means 57 does not remove the energization from the coil 62. In addition to switch contacts 62a, the energization of coil 62 results in the closing of normally open switch contacts 62b, which are electrically disposed in a conductor 66 between connector contact C and a source connector contact D.

Contact D corresponds to the power path 20 previously described with reference to FIG. 1. As long as coil 62 is energized, system voltage will be present on contact D which, as will be shown in detail below, makes the system voltage available to the output plug 71 of the subsequent module; in this case control module 16.

Since the switch contacts 62a latch the system current through the coil 62, the only way to remove system voltage from main control module connector contact D, and thus from the output plug 71 of control module 16, is to open one or both of the normally closed switches in the conductors 51 and 53 which serve as the voltage source and return paths, respectively.

Thus, when all of the necessary control modules have been plugged together and a power module and main control module plugged into the ends thereof, operation is initiated by operating the switch means 57 of the main control module, which results in the energization of the first module adjacent to the main control module, such that the operation controlled by plug 71 commences.

With source contact D energized, output plug 71 of module 16 is energized by virtue of the continuous circuit formed by conductor 72, conductor 73, a by-pass switch 74, normally closed contacts 84a, fuse 76, conductor 77, plug 71 and conductor 78. As a means for interrupting this source of electrical energy to plug 71 and transferring it to another module, control module 16 is provided with a transfer circuit comprising relay coils 84 and 86 which operate associated switch contacts and which are energized through the operation of a switch means 81. Switch means 81 includes a remote switch plug 82 and a push button switch 83. The push button switch 83 provides means for manual operation of the control module, while the plug 82 is provided to receive a remote switch (not shown) operated by a predetermined relevant event. Since both switch 83 and plug 82 are normally open, the switch means 81 is also normally open.

An electrical conductor 87 electrically joins one side of switch means 81 to the coil 84 while a conductor 88 joins the other side of coil 84 to the return path conductor 53. The other side of switch means 81 is electrically joined to the source contact D of the input connector of module 16. A conductor 91 joins one side of relay coil 86 to the conductor 88 and thus return path conductor 53, while the other side of coil 86 is electrically joined to the source conductor 51 through a conductor 92 containing normally open switch contacts 84b, and electrical conductor 93. The electrical conductor 93 is electrically joined between the source conductor 51 and the conductor 87 between switch means 81 and coil 84, and includes normally open switch contacts 84c.

When the switch means 81 is operated (either manually or automatically) a complete circuit including coil 84 is formed, whereby coil 84 is energized and all of the switch contacts associated therewith are operated. Thus, switch contacts 84a in the circuit which supplies plug 71 with a source of electrical energy, are opened and the plug is de-energized. In addition, the switch contacts 84c close forming a latching circuit which maintains energization of coil 84 even after the switch means 81 is no longer operated. The normally open switch contacts 84b also close, providing a complete circuit which includes coil 86 whereby coil 86 becomes energized and the normally closed contacts 86a and 86b in the return and source conductors 53 and 51, respectively, are opened. Once contacts 86a and 86b open, the source of electrical energy to the coil 62 in the main control module 14 is no longer available, whereby the connector contact D thereof no longer sees source voltage. Thus, the plug 71 loses its energization and is no longer capable of being energized since the source voltage to the main control module 14 through connector contact C has been effectively removed by the opening of switch contacts 86a and 86b. As long as switch contacts 86a and 86b are open, the operation of switch means 57 will have no effect, and thus a malfunction due to an ill-timed operation of switch means 57 is impossible.

The output connector contact D of module 16 is electrically connected to the source line 51 by a conductor 96 which includes normally open contacts 86c which close when relay coil 86 is energized. The conductor 96 is electrically joined to conductor 51 in advance of switch contacts 86b such that the closing of contacts 86c places source voltage at output connector contact D of the module 16.

Thus, the overall effect of operating switch means 81 is the transfer of system voltage from the input source contact D to the output source contact D, and thus from the plug 71 of module 16 to the plug of a subsequent module. When the module 16 is plugged into the power module 12 instead of another control module, the energization of output connector contact D results in a complete circuit including the relay coil 36, whereby relay coil 36 is energized and the normally closed switch contacts 36a and 36b open. The switch contacts 36a and 36b are redundant in that opening of either set of contacts results in the power source being effectively removed from the rest of the system, and thus the presence of both contacts is primarily for safety reasons in the event one should fail to operate. Once contacts 36a and 36b open, the relay coils 84 and 86 in the control module 16 become de-energized and the switch contacts 86a and 86b close, while the contacts 86c open. The opening of contacts 86c de-energizes coil 36 causing the contacts 36a and 36b to re-close, thus placing the system in its initial state wherein it is in condition to respond to operation of switch means 57 in the main control module to start a new cycle. If the switch 58 had been closed, the recycling would begin automatically without the necessity of a start signal as by manually operating switch 59, or automatically operating switch plug 61.

Plug contacts G provide an automatic recycle circuit which, unlike switch 58, does not result in the beginning of a new cycle each time the system shuts down (as due to a malfunction, etc.). The contacts G of power module 12 are joined to contact D by conductor 101 which contains a switch 102. When switch 102 is closed, the energization of output contact D of module 16 results in a voltage at power module contact G which is directed through conductor 103 between the contacts G—G of module 16 to contact G of main control module 14. A conductor 104 joins contact G to coil 62 whereby the coil is energized when contact G is energized and the ensuing operation is the same as if switch means 57 had been operated.

A pre-set counter 107 having a set of normally closed contacts 107a in the output line of plug 31 (power module) can be used to limit the number of cycles performed by the controlled tool. The counter is disposed between the contact and the negative side of plug 31 and is pulsed each time contact D is energized until the number of pulses received equals a pre-set number at which time the switch 107a opens.

The bypass switch 74 in the module 16 includes a normally closed set of contacts 74a and a normally open set of contacts 74b which make it possible for the module to be electronically removed from a system without actually being unplugged and physically removed. Normally closed switch contacts 74a are disposed in the conductor 72 and placed in series with the normally closed switch 84a and fuse 76 in the circuit of the output plug 71. The normally open switch contacts 74b are disposed in a conductor 97 which connects one side of relay coil 84 to the input connector contact D, the conductors 72 and 73. When the switch is in its normal condition the operation of the system is as previously described with the plug 71 being energized until the coil 84 is energized by operation of switch means 81. When bypass switch 74 is operated, however, the switch contacts 74 open, breaking the continuity in the circuit of plug 71, whereby the energization of input source connector contact D does not result in energization of plug 71 as previously described. Also, the closing of switch contacts 74b makes a direct connection between the coil 84 and the connector contact D such that energization of the contact D does result in energization of coil 84, which, as previously described, results in the energization of coil 86 and the completion of a circuit which results in source power being delivered to the output source connector contact D of module 16. Thus, with the bypass switch operated, the device controlled by plug 71 is not energized in response to the operation of switch means 57 in main control module 14, and the energization of coils 84 and 86 takes place without the necessity of operating switch means 81.

The use of bypass switch 74 becomes very important when a tool can be operated in several ways by either adding or eliminating certain operations steps which the tool is capable of performing. Rather than having a separate control system for each mode of operation for the tool, and to eliminate the necessity of having to unplug and remove certain modules for a change in mode of operation of the tool, the switches 74 are simply operated to eliminate unnecessary tool operations.

Referring now to FIG. 5, an alternate embodiment of a standard control module (a control module which automatically becomes de-energized when the subsequent module becomes energized) differs from the embodiment of FIG. 3 in that a single relay coil 116 which operates normally closed switch contacts 116a, 116b and 116c in addition to the normally open contact switches 116d and 116e, provides substantially the same performance as the two coils 84 and 86 in the aforementioned embodiment. The normally closed contacts 116a and 116b together with normally closed contacts 116c perform the previously described functions of removing power from the plug 71 and form discontinuities in conductors 53 and 51 to prevent power from reaching the down-current modules. Normally open contacts 116d serve as latching contacts to maintain coil 116 energized after the switch means 81 is no longer operated. The contacts 116e operate when closed to provide source power to the subsequent module. Thus the operation of the module of FIG. 5 is identical with that of the module of FIG. 3 but employs a single coil driving five switches in place of two coils which share the switch load.

Referring to FIG. 6, yet another variation on the standard module employs a mechanical latching relay 121 which holds its operated condition after the switch means 81 is no longer operated by virtue of a mechanical latch. In order to unlatch the solenoid a coil 122 is disposed in a circuit between output connector contact E and the conductor 46 which leads to the negative side of plug 31 (see FIG. 2). The input connector contact E is connected by a conductor 123 to the output connector D so that when the source power is directly to the next subsequent module a signal is made available to the next prior module. Thus, while in previously described embodiments the transfer of the system power to a subsequent module was accompanied by the release of the electrical latch to the coils of the prior module, in this embodiment the latch is mechanical requiring electrical current to perform the unlatching operation.

FIG. 7 is a schematic illustration of a special module which differs from the various standard modules previously described with reference to FIGS. 3, 5 and 6. All of the standard modules operate in substantially the same manner in that they respond to a control signal by de-energizing their associated plug and transfer the source of electrical current to the next module. The special module such as module 130 operates to establish a voltage at output plug 131 and continues to provide that voltage even after a control signal has operated a switch means 132. In fact, once energized the special module remains so conditioned regardless of the energization and de-energization of subsequent modules (its energization is independent of the state of source conductor switches) until such time as the special module is specifically de-energized by operation of a switch means 133.

In order to energize the plug 131 from a source which is independent of the condition of subsequent modules, plug 131 is electrically joined to conductors 46 and 41 which join the connector contacts F—F and A—A respectively. The plug 131 is connected to conductor 46 by a conductor 134 and to conductor 41 by a conductor 136.

Conductor 136 includes the series circuit of fuse 137 and normally open contacts 144a. Conductor 41 has previously been described as being continually in electrical communication with the positive side of input plug 31 while the conductor 46 has been described as being continually in contact with the negative side of plug 31 (see FIG. 2). Thus, once contacts 144a are closed the plug 131 is energized and the occurrence of open contacts in the conductors 53 and 51 which join the connector contacts B—B and C—C respectively, does not operate to discontinue the energization of the plug 131 as was the case in previously described modules.

The normally open contacts 144a are operated by a pulse operated relay 144, one end of which is electrically joined to the conductor 134 by a conductor 138, and the other end of which is electrically joined by a conductor 139 to a conductor 141. The conductor 141 is electrically joined to one side of bypass switch 142, the other side of which is electrically joined to a conductor 143 which leads to input source connector contact D and which includes normally closed contacts 144b. The relay 144 is a latching relay which responds to a pulse by operating all of its associated contacts and maintaining those contacts operated until it receives a subsequent pulse which returns the contacts to their normal condition. Thus when a module prior to the special module receives a signal which results in its output source connector contact D being energized, the coil 144 is pulsed causing contacts 144a to close and contacts 144b to open. The closing of contacts 144a results in the energization of plug 131, while the opening of contacts 144b effectively disconnects the relay 144 from the contact D such that a subsequent energization of contact D will not result in the coil returning its contacts to their unoperated state.

When an event occurs which is previously determined as marking the time when the next subsequent module is to be energized, the switch means 132 is operated (either manually, remotely or automatically) resulting in the energization of a relay coil 146 and the closing of the normally open contacts 146a and 146b associated therewith. The contacts 146a are latching contacts to enable the coil 146 to maintain its energization even after the switch means 132 is no longer operated. The contacts 146b are electrically joined between conductor 41 and output source connector contact D whereby the contact becomes energized, making electrical energy available to the plug of the next subsequent module. In previously described modules, the energization of the relay coil, which produced electrical voltage on the output source connector contact D, also resulted in a de-energization of the output plug associated with that module. In this special module, however, the energization of coil 146 does not affect the circuit which supplies electrical energy to the plug 131, and thus electrical energy continues to be made available from plug 131 along with the electrical energy now available from the output plug of the next subsequent module.

A switch means 133 including a manually operated push button switch 133a and a remote switch plug 133b are electrically joined in parallel between the conductors 136 and 141. Operation of the switch means 133 as by operation of push button switch 133a or a remote switch associated with plug 133b, results in a pulse being delivered to coil 144 which, as previously described, causes the relay to operate and return its associated contacts to their normal state. Thus the contacts 144a open and the circuit which delivers current to output plug 131 is broken whereby the plug is de-energized.

A time operated special module can be formed by replacing the push button switch 133a with a time delay switch which receives the same signal which operates switch means 132 but which is delayed in operation by a predetermined time. Thus the signal which operates switch means 132 and time delay switch means 133 would have the effect of energizing the next subsequent module which would operate simultaneously with the special module until such time as the time operated switch operated, causing the coil 144 to be pulsed.

While the special module described above is subject to many variations in form, it is essential that the plug 131 receive its energization from a source which is independent of the conductors 51 and 53 since these conductors are disassociated from the main power source by the operation of subsequent modules. In fact, while the particular circuits described above with regard to both the standard and special control modules are considered advantageous, they do not represent the only circuits capable of performing the functions described. There are however, certain physical requirements of the standard and special modules which must be fulfilled if the desired operation is to be achieved. Since the present invention is designed to enable any desired combination of standard and special modules to be serially associated with one another through plug-in connectors, each module has a direct or indirect effect on one or more of the other modules. As pointed out above, the power module is associated with given control module through other control modules, and unless all of the control modules include certain circuit arrangements, necessary continuity cannot be assured. This requirement is not present in those systems wherein all of the control modules plug directly into a main power module. The present invention has the advantage over the aforementioned arrangement in that there is virtually no limit to the number of control modules which may be combined wherein systems which directly connect control modules into a power module have a limited number of control modules.

Thus in the foregoing description it is noted that each module includes one or more continuous conductors between input and output plug connectors of like designation. At the same time there are a number of conductors in each module which join like designated plug connectors but which also include switches which make it possible to form a discontinuity in those particular conductors. By properly associating the operative electronic circuitry with the conductors which include switches and those which do not include switches, it becomes possible to produce the results described above with a system which serially orients the various control modules which form a given system.

What is claimed is:

1. A modular control system for operating one or more power operated devices equipped to produce signals upon reaching certain predetermined stages of their operation, comprising in combination:

a power module supplying a source of electrical energy, said power module including a plug connector having a plurality of contacts;

at least one control module for selectively supplying electrical energy to a power operated device, said control module including means responsive to a device signal to terminate the supply of electrical energy therefrom, said control module including an input plug connector having a plurality of contacts including an input source contact and an output plug connector having a plurality of contacts including an output source contact, said output plug connector operable to electrically join said control module to said power module or to the input plug connector of another control module; and a main control module for initiating operation of said system, said main control module including output plug connector means having a plurality of contacts including an output source contact, said connector operable together with the input connector of a control module to electrically join said main control module to a control module, said main control module including start means responsive to a signal from a device to direct electrical energy to the control module to which it is connected by its connector plug.

2. The system of claim 1 wherein said control modules further comprise;
at least two electrically continuous conductors forming uninterrupted paths between two pairs of input and output contacts of said control module's plug connector whereby at least two current paths are established between said power module and said main control module regardless of the number of control modules interconnected therebetween.

3. The system of claim 2 wherein said control module further comprises;
at least one source conductor joining an input plug connector contact to an output plug connector contact and including a normally closed switch which is selectively operable to form an electrical discontinuity in said source conductor and thereby effectively disconnect the plug contacts joined thereby.

4. The system of claim 3 wherein said control module further comprises:
plug means for supplying electrical energy to a device associated therewith; and
circuit means electrically connecting one side of said plug means to said control module input source contact and the other side of said plug to ground whereby said plug means is energized for supplying electrical energy to a device when electrical energy is avilable at the control module input source contact.

5. The system of claim 4 wherein said control module further comprises;
transfer circuit means electrically connected between said source conductor and said control module output source contact which when operatively disposed joins to an input source contact of the input connector of another module, said transfer circuit means disposed to receive a device signal and responsive thereto to form a complete circuit whereby said control module output source contact supplies electrical energy to an input source contact joined thereto.

6. The system of claim 5 wherein said transfer circuit means joins to said source conductor between said normally closed switch in said source conductor and said connector and further comprises;
switch operating means operable in response to said transfer circuit means receiving a signal from a device to open said normally closed switch.

7. The system of claim 5 further comprising;
selectively operable bypass switch means electrically connecting said control module input source contact to said transfer circuit means and operable when closed to direct electrical energy at said control module input source contact to said second circuit means whereby said second circuit means operates in the same manner as if it had received a device signal and thus energize the control module output source contact while preventing energization of said control module plug means whereby the device operated by said control module is bypassed.

8. The system of claim 3 wherein said power module further comprises;
a pair of connector contacts for joining to those control module output connector contacts which are electrically joined to said electrically continuous conductors, one of said pair of power module connector contacts being electrically maintained at a selected operating voltage and the other contact being maintained at ground.

9. The system of claim 8 wherein said control module further comprises:
plug means for supplying electrical energy to a device associated therewith;
first circuit means electrically joining one side of said plug means to one of said electrically continuous conductors; and
second circuit means selectively joining the other side of said plug means to the other electrically continuous conductor, said second circuit means operatively associated with said control module input source contact and responsive to electrical energy thereat to connect the other side of said plug means to the other electrically continuous conductor whereby said plug means is energized and independent of the state of source conductor switches.

10. The system of claim 9 wherein said means responsive to a device signal to terminate the supply of electrical energy to a power operated device includes time delay means whereby the supply of electrical energy continues for a preselected time after the occurrence of the device signal.

11. The system of claim 9 wherein said second circuit means comprises;
a latching relay including a first set of switch contacts operated thereby, said switch contacts being electrically disposed between the other side of said plug and the other electrically continuous conductor, said latching relay electrically joined to said control module input source connector contact and responsive to energization thereat to operate said switch contacts to their closed condition and maintain them so operated until another pulse signal is received.

12. The system of claim 11 wherein said second circuit further comprises;
a second set of switch contacts operated by said latching relay and electrically disposed between said latching relay and said control module output connector source contact and operative when in their open condition to electrically disassociate said latching relay from said source contact whereby subsequent energization of said source contact will not cause said relay to return its switch contacts to their normal condition.

13. The system of claim 12 further comprising;
circuit means disposed to receive a device signal and responsive thereto to pulse said latching relay.

14. The system of claim 8 wherein said main control module further comprises:
a pair of main control module connector contacts for joining to those input connector contacts of a control module which are joined to said electrically continuous conductors; and
main control module switch means for energizing said system, said switch means connected to said pair of main control module connector contacts and selectively operable to form a complete circuit through which current can flow including said electrically continuous conductors of said control module.

15. The system of claim 14 wherein said start means of said main control module comprises:
normally open start switch means electrically joined between said main control module output source contact and a source of electrical energy; and
start switch operating means for closing said switch and thereby energizing said main control module output source contact.

16. The system of claim 15 further comprising:
an electrically continuous recycle conductor joining a recycle contact of said input plug connector of said control module to a recycle contact of said output plug connector of said control module;
a power module connector plug source contact disposed to join to a control module output source contact;
a power module connector plug recycle contact disposed to join to a control module output recycle contact and electrically joined to said power module connector plug source contact whereby energization of the output source contact of a control module joined to said power module results in energization of said recycle conductor; and
a main control module connector plug recycle contact disposed to join to a control module input connector contact and electrically connected to said start switch operating means whereby said switch operating means causes said normally open start switch means to close in response to energization of said recycle conductor.

17. The system of claim 15 further comprising:
counter switch means electrically joined to said power module source contact whereby said counter switch means is pulsed each time said system cycles, said switch means operable in response to receiving a predetermined number of pulses to shut the system down.

18. A modular control system for initiating a plurality of machine operations wherein certain stages of the machine operations are evidenced by control signals from said machine or machines, comprising in combination:
a power module supplying a source of electrical energy;
a main control module for initiating system operation and including circuit means responsive to a start signal to energize its output;
a plurality of control modules each having an input and an output and including circuit means responsive to electrical energy at its input to energize a plug means associated therewith for connection with the machine, said control modules further including transfer circuit means disposed to receive control signals and responsive thereto when, and only when, the plug means of their respective control modules are energized to energize their output; and
connector means electrically joining the several control modules in electrical series between said power module and said main control module whereby each control module has its input joined to the output of an adjoining control module and its output joined to the other adjoining control module, except for one of said control modules which has its input connected to said main control module and except for another of said control modules which has its output connected to said power module.

19. The control system of claim 18 wherein said control module transfer circuit means is further responsive to a control signal to cause the plug means of its control module to be de-energized.

References Cited

UNITED STATES PATENTS 3,153,728   10/1964   Procter _____ 307—39 X
3,249,703   5/1966   Rickert _____ 307—36 X ROBERT K. SCHAEFER, *Primary Examiner.*

H. J. HOHAUSER, *Assistant Examiner.*